United States Patent
Singleton

(10) Patent No.: US 9,669,888 B1
(45) Date of Patent: Jun. 6, 2017

(54) BICYCLE LOCK AND ASSOCIATED USE THEREOF

(71) Applicant: Gregory Singleton, Philadelphia, PA (US)

(72) Inventor: Gregory Singleton, Philadelphia, PA (US)

( * ) Notice: Subject to any disclaimer, the term of this patent is extended or adjusted under 35 U.S.C. 154(b) by 0 days.

(21) Appl. No.: 15/001,104

(22) Filed: Jan. 19, 2016

Related U.S. Application Data

(60) Provisional application No. 62/104,263, filed on Jan. 16, 2015.

(51) Int. Cl.
*B62H 5/00* (2006.01)
*E05B 67/00* (2006.01)
*E05B 67/28* (2006.01)
*B62H 5/14* (2006.01)

(52) U.S. Cl.
CPC ............. *B62H 5/003* (2013.01); *B62H 5/005* (2013.01); *B62H 5/14* (2013.01); *E05B 67/006* (2013.01); *E05B 67/28* (2013.01)

(58) Field of Classification Search
CPC ............. Y10T 70/5872; Y10T 24/2183; Y10T 70/483; Y10T 70/435; Y10T 70/40; Y10T 70/50; Y10T 70/5009; Y10T 70/437; Y10T 70/04; E05B 67/006; E05B 45/005; E05B 73/0011; E05B 67/003; E05B 37/025; E05B 71/00; E05B 67/28; B62H 5/003; B62H 5/005; B62H 5/14
USPC ...................................... 70/14, 58, 233.3, 49
See application file for complete search history.

(56) References Cited

U.S. PATENT DOCUMENTS

| | | | | |
|---|---|---|---|---|
| 2,933,915 A * | 4/1960 | Gossner | ............... | E05B 67/006 70/49 |
| 3,981,166 A * | 9/1976 | Madonna | ............... | B62H 5/003 224/426 |
| 4,033,160 A * | 7/1977 | Mima | ................... | B62H 5/003 70/227 |
| 4,098,099 A * | 7/1978 | Smith | ................... | B62H 5/003 70/18 |
| 4,126,024 A * | 11/1978 | Timmons | ............... | B62H 5/003 242/379.2 |
| 4,543,806 A * | 10/1985 | Papandrea | ............ | E05B 67/006 242/380 |
| 4,663,611 A * | 5/1987 | Humphrey | ............ | E05B 45/005 340/426.22 |
| 4,685,697 A * | 8/1987 | Thorley | ................. | A63C 9/002 280/637 |
| 4,756,171 A * | 7/1988 | Homar | .................. | E05B 67/006 70/18 |

(Continued)

*Primary Examiner* — Suzanne Barrett

(57) ABSTRACT

A bicycle lock includes a housing having a retractable spool positioned therein, a flexible cable releasably wound about the retractable spool and partially exposed exterior of the housing, a fastener attached to the flexible cable and located exterior of the housing, and a locking mechanism located at the housing and selectively engaged with the fastener and the retractable spool. Advantageously, when the fastener is inserted into the locking mechanism and the locking mechanism is disposed at a first position, the flexible cable has a fixed longitudinal length. Advantageously, when the fastener is removed from the locking mechanism and the locking mechanism is disposed at a second position, the flexible cable has an adjustable longitudinal length. Notably, the first position is a locked position, and the second position is an unlocked position.

8 Claims, 4 Drawing Sheets

(56) References Cited

U.S. PATENT DOCUMENTS

| | | | | |
|---|---|---|---|---|
| 4,776,188 A * | 10/1988 | Dalaba | B62H 5/003 70/233 |
| 5,023,596 A * | 6/1991 | Sirman | B62H 5/20 340/571 |
| 5,408,212 A * | 4/1995 | Meyers | B62H 5/20 340/426.28 |
| 5,768,920 A * | 6/1998 | DeBevoise | E05B 73/0005 70/18 |
| 5,836,002 A * | 11/1998 | Morstein | B60R 25/1001 340/427 |
| 6,550,293 B1 * | 4/2003 | Delegato | E05B 67/006 211/4 |
| 6,604,390 B1 * | 8/2003 | Nooner | B65D 55/14 109/50 |
| 7,168,275 B2 * | 1/2007 | Fawcett | E05B 45/005 242/382 |
| 7,186,914 B1 * | 3/2007 | Knight | B62H 5/003 174/50 |
| 7,272,962 B2 * | 9/2007 | Benda | E05B 67/006 70/18 |
| 2003/0089141 A1 * | 5/2003 | Edwards | A63C 11/006 70/18 |
| 2003/0204938 A1 * | 11/2003 | Hammerslag | A43B 5/16 24/68 SK |
| 2009/0113946 A1 * | 5/2009 | Baumgarten | E05B 67/006 70/18 |
| 2010/0052907 A1 * | 3/2010 | Shannon | B62H 5/00 340/568.6 |
| 2010/0154492 A1 * | 6/2010 | Ellis | B62H 5/003 70/233 |
| 2011/0072862 A1 * | 3/2011 | Avganim | E05B 67/006 70/58 |
| 2011/0209508 A1 * | 9/2011 | Andersen | B62H 3/04 70/233 |

\* cited by examiner

BICYCLE LOCK AND ASSOCIATED USE THEREOF

CROSS REFERENCE TO RELATED APPLICATIONS

This is a non-provisional patent application that claims the benefit of U.S. provisional patent application No. 62/104,263 filed Jan. 16, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

Exemplary embodiment(s) of the present disclosure relate to bicycle locks and, more particularly, to a bicycle lock that is easily secured to a bicycle framework and thereby enabling the user to lock various components of the bike with one, handy device.

Prior Art

Every day, thousands of bicycles are stolen from bike racks, driveways, yards and dorm rooms across the country. According to recent statistics compiled by the Federal Bureau of Investigation (FBI), nearly 1.5 million bicycles are stolen in the United States annually, and the numbers are on the rise. The increasing popularity of bicycling as a sport and a means of transportation has made bicycles an easy target for thieves. Nowhere is bicycle theft a bigger problem than on college campuses, where nearly half of all property crime reported involves the theft of bicycles. Unfortunately, even with the application of a heavy duty bicycle lock, entire bicycles, or basic components of the bike, can nonetheless be stolen.

According to the FBI statistics, many thefts will steal a frame from one bike and the tires from another, assembling a new bicycle from these stolen parts. In fact, countless consumers have experienced the scenario of arriving at the bike rack where they have locked their bicycle, only to find that their bicycle frame is securely locked to the rack while both tires are missing.

Accordingly, a need remains for a bicycle lock in order to overcome at least one prior art shortcoming. The exemplary embodiment(s) satisfy such a need by providing a bicycle lock that is easily secured to a bicycle framework that is convenient and easy to use, lightweight yet durable in design, versatile in its applications, and designed for enabling the user to lock various components of the bike with one, handy device.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a bicycle lock for enabling a user to lock various components of a bicycle. These and other objects, features, and advantages of the non-limiting exemplary embodiment(s) are provided by, a bicycle lock including a housing having a retractable spool positioned therein, a flexible cable releasably wound about the retractable spool and partially exposed exterior of the housing, a fastener attached to the flexible cable and located exterior of the housing, and a locking mechanism located at the housing and selectively engaged with the fastener and the retractable spool. Advantageously, when the fastener is inserted into the locking mechanism and the locking mechanism is disposed at a first position, the flexible cable has a fixed longitudinal length. Advantageously, when the fastener is removed from the locking mechanism and the locking mechanism is disposed at a second position, the flexible cable has an adjustable longitudinal length. Notably, the first position is a locked position, and the second position is an unlocked position.

In a non-limiting exemplary embodiment, the flexible cable includes a proximal end statically affixed to the fastener, a distal end statically affixed to the retractable spool, and a medial portion monolithically formed with the proximal end and the distal end.

In a non-limiting exemplary embodiment, the locking mechanism includes a first receiving slot positioned along an outer peripheral edge of the housing, wherein the fastener is slidably inserted into the first receiving slot and is frictionally fit therein such that the first receiving slot is releasably engaged with the fastener.

In a non-limiting exemplary embodiment, the retractable spool includes a central hub statically affixed to an interior of the housing and anchored to the distal end of the flexible cable, and a spring is coupled to the central hub. Such a spring is selectively biased between a non-tensioned state and a tensioned state when the central hub is articulated in a first rotational direction and an opposite second rotational direction, respectively. Advantageously, the spring automatically returns to the non-tensioned state when the locking mechanism is operably disengaged from the retractable spool. Advantageously, the spring is maintained at the tensioned state when the locking mechanism is operably engaged to the retractable spool and the medial portion is partially extracted from the housing.

In a non-limiting exemplary embodiment, the retractable spool includes a plurality of spokes fixedly coupled to the spring.

In a non-limiting exemplary embodiment, the locking mechanism further includes a portable key a second receiving slot operably engaged with the portable key, and a lever operably connected to the second receiving slot. In this manner, the lever is selectively engaged and disengaged with the plurality of spokes when the portable key rotates the second receiving slot to the locked first position and the unlocked second position, respectively.

In a non-limiting exemplary embodiment, the flexible cable advantageously has the fixed longitudinal length when the fastener is positioned within the first receiving slot and the locking mechanism is engaged with the retractable spool. Conversely, the flexible cable advantageously has the adjustable longitudinal length when the fastener is removed from the first receiving slot and the locking mechanism is disengaged from the retractable spool.

The present disclosure further includes a method of utilizing a bicycle lock for enabling a user to lock various components of a bicycle. Such a method includes the initial steps of: obtaining a bicycle; and obtaining a bicycle lock. Such a bicycle lock includes a housing having a retractable spool positioned therein a flexible cable releasably wound about the retractable spool and partially exposed exterior of the housing, a fastener attached to the flexible cable and located exterior of the housing, and a locking mechanism located at the housing and selectively engaged with the fastener and the retractable spool.

The method further includes the steps of: engaging the bicycle lock with the bicycle; causing the flexible cable to have a fixed longitudinal length by inserting the fastener into the locking mechanism and disposing the locking mechanism at a locked first position; and causing the flexible cable to have an adjustable longitudinal length, by removing the fastener from the locking mechanism and disposing the locking mechanism to an unlocked second position.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
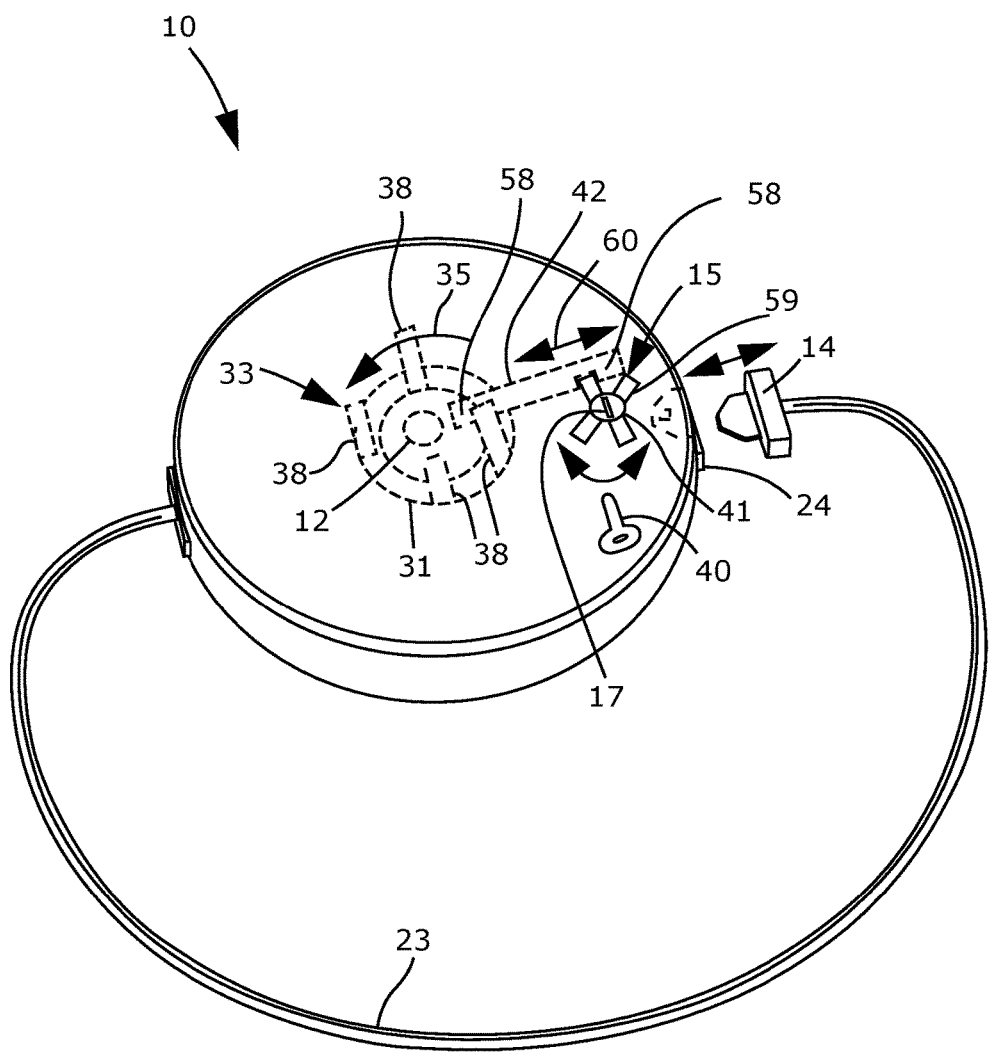
FIG. 1 is a perspective view of a bicycle lock, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

A non-limiting exemplary embodiment(s) of the present disclosure is referred to generally in the figures and is intended to provide a bicycle lock 10 that is easily secured to a bicycle 50 framework and thereby enabling the user to lock various components of the bicycle 50 with one, handy device. It should be understood that the exemplary embodiment(s) may be used to lock a variety of bicycle components, and should not be limited to any particular bicycle component(s) described herein.

Figure 2:
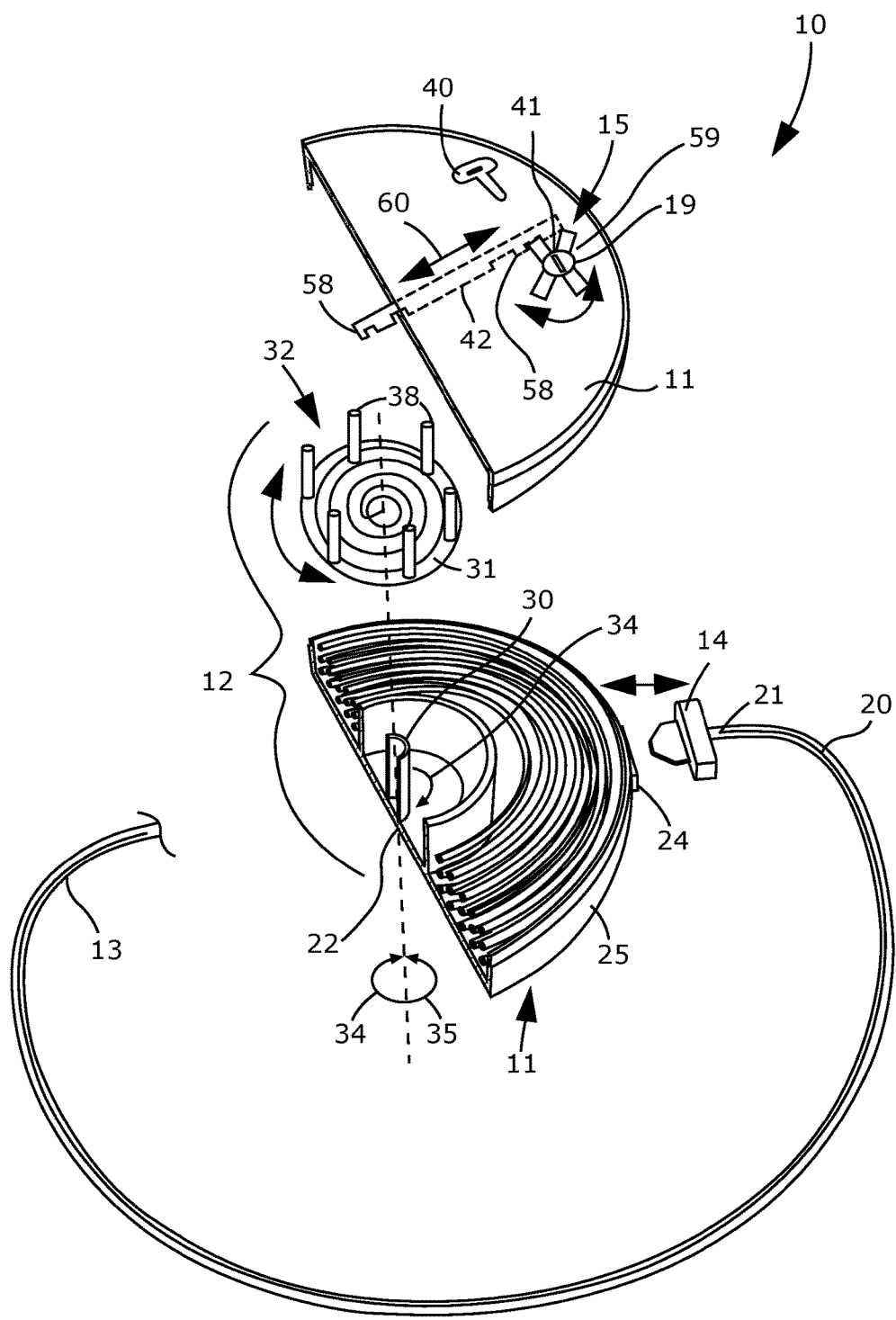
FIG. 2 is an exploded view showing the structural interrelationship between the retractable spool, locking mechanism and cable.
Figure 3:
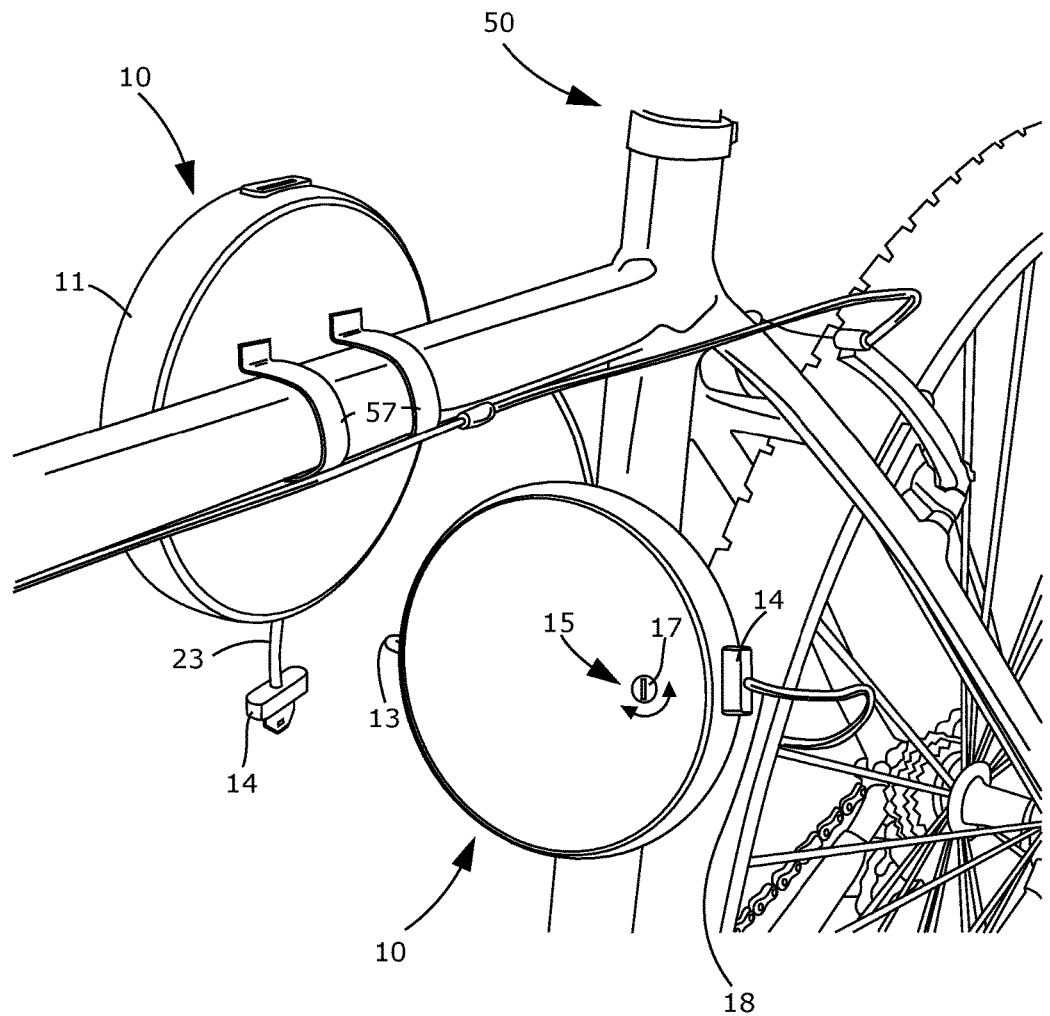
FIG. 3 is a perspective view illustrating two bicycle locks engaged with a bicycle frame.
Figure 4:
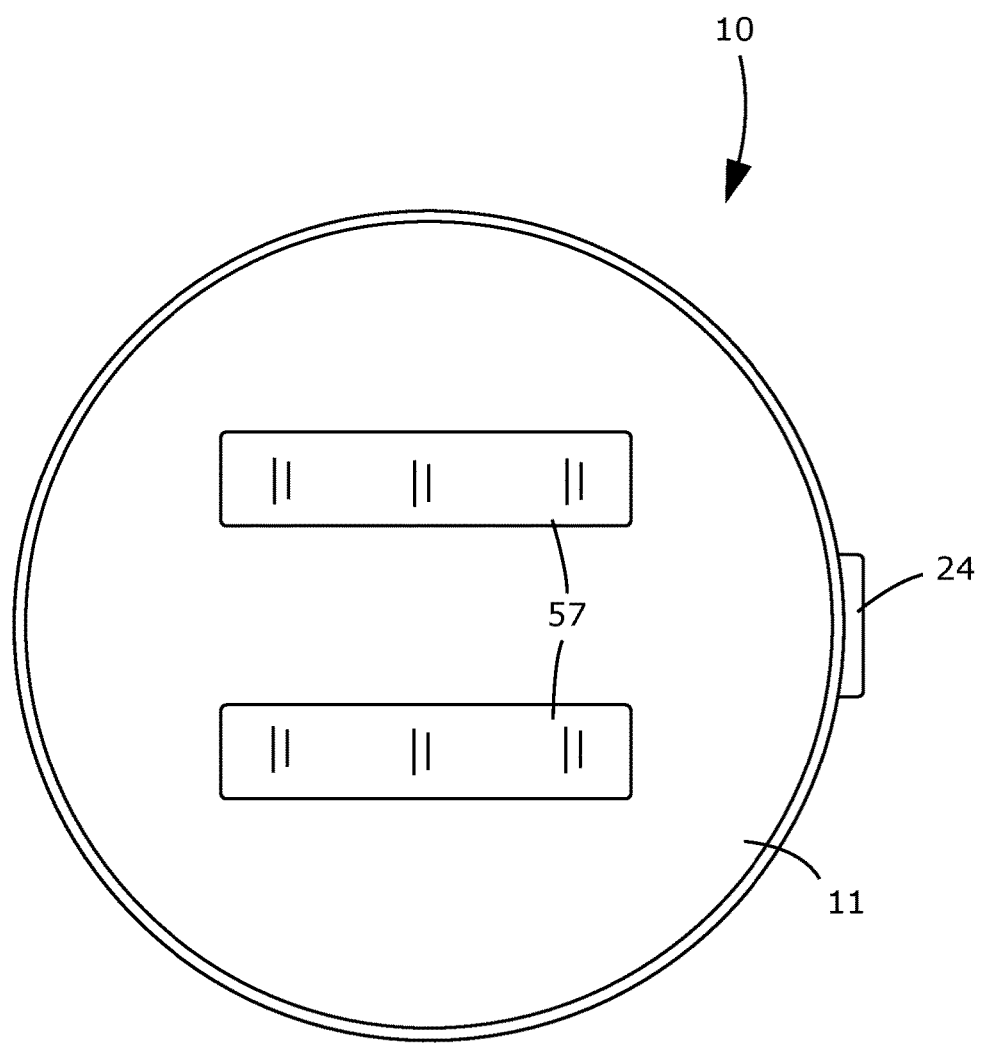
FIG. 4 is a rear elevational view illustrating support straps attached to a rear face of the bicycle lock housing.

The non-limiting exemplary embodiment(s) is/are referred to generally in FIGS. 1-4 and is/are intended to provide a bicycle lock 10 including a housing 11 having a retractable spool 12 positioned therein, a flexible cable 13 releasably wound about the retractable spool 12 and partially exposed exterior of the housing 11, a fastener 14 attached to the flexible cable 13 and located exterior of the housing 11, and a locking mechanism 15 located at the housing 11 and selectively engaged with the fastener 14 and the retractable spool 12. Advantageously, when the fastener 14 is inserted into the locking mechanism 15 and the locking mechanism 15 is disposed at a first position 17, the flexible cable 13 has a fixed longitudinal length 18. Advantageously, when the fastener 14 is removed from the locking mechanism 15 and the locking mechanism 15 is disposed at a second position 19, the flexible cable 13 has an adjustable longitudinal length 20. Notably, the first position 17 is a locked position, and the second position 19 is an unlocked position.

In a non-limiting exemplary embodiment, the flexible cable 13 includes a proximal end 21 statically affixed to the fastener 14, a distal end 22 statically affixed to the retractable spool 12, and a medial portion 23 monolithically formed with the proximal end 21 and the distal end 22.

In a non-limiting exemplary embodiment, the locking mechanism 15 includes a first receiving slot 24 positioned along an outer peripheral edge 25 of the housing 11, wherein the fastener 14 is slidably inserted into the first receiving slot 24 and is frictionally fit (e.g., snap fit) therein such that the first receiving slot 24 is releasably engaged with the fastener 14.

In a non-limiting exemplary embodiment, the retractable spool 12 includes a central hub 30 statically affixed to an interior of the housing 11 and anchored to the distal end 22 of the flexible cable 13, and a spring 31 is coupled to the central hub 30. Such a spring 31 is selectively biased between a non-tensioned state 32 and a tensioned state 33 when the central hub 30 is articulated in a first rotational direction 34 (e.g., clockwise) and an opposite second rotational direction 35 (e.g., counter clockwise), respectively. Advantageously, the spring 31 automatically returns to the non-tensioned state 32 when the locking mechanism 15 is operably disengaged from the retractable spool 12. Advantageously, the spring 31 is maintained at the tensioned state 33 when the locking mechanism 15 is operably engaged to the retractable spool 12 and the medial portion 23 is partially extracted from the housing 11.

In a non-limiting exemplary embodiment, the retractable spool 12 includes a plurality of spokes 38 fixedly coupled to the spring 31.

In a non-limiting exemplary embodiment, the locking mechanism 15 further includes a portable key 40, a second receiving slot 41 operably engaged with the portable key 40, and a lever 42 operably connected to the second receiving slot 41. For example, lever 42 may have axially opposed serrated teeth 58 operably engaged with a rotatable gear 59 in operable communication with the second receiving slot 41. In this manner, the lever 42 is selectively reciprocated along a linear travel path 60 and thereby engaged and disengaged with the plurality of spokes 38 when the portable key 40 rotates the second receiving slot 41 to the locked first position 17 and the unlocked second position 19, respectively.

In a non-limiting exemplary embodiment, the flexible cable 13 advantageously has the fixed longitudinal length 18 when the fastener 14 is positioned within the first receiving slot 24 and the locking mechanism 15 is engaged with the retractable spool 12. Conversely, the flexible cable 13 advantageously has the adjustable longitudinal length 20 when the fastener 14 is removed from the first receiving slot 24 and the locking mechanism 15 is disengaged from the retractable spool 12.

The present disclosure further includes a method of utilizing a bicycle lock 10 for enabling a user to lock various components of bicycle 50. Such a method includes the initial steps of: obtaining a bicycle 50; and obtaining a bicycle lock 10. Such a bicycle lock 10 includes a housing 11 having a retractable spool 12 positioned therein a flexible cable 13 releasably wound about the retractable spool 12 and partially exposed exterior of the housing 11, a fastener 14 attached to the flexible cable 13 and located exterior of the housing 11, and a locking mechanism 15 located at the housing 11 and selectively engaged with the fastener 14 and the retractable spool 12.

The method further includes the steps of: engaging the bicycle lock 10 with the bicycle 50; causing the flexible cable 13 to have a fixed longitudinal length 18 by inserting the fastener 14 into the locking mechanism 15 and disposing the locking mechanism 15 at a locked first position 17; and causing the flexible cable 13 to have an adjustable longitudinal length 20, by removing the fastener 14 from the locking mechanism 15 and disposing the locking mechanism 15 to an unlocked second position 19.

Referring to the figures in general, in a non-limiting exemplary embodiment(s), bicycle lock 10 is a specially designed security lock featuring a retractable cable 13 that enables the user to thread the lock 10 about various components of their bicycle 50 and to a bike rack (not shown) or other secure post, thus effectively preventing bicycle theft from occurring. Bicycle lock 10 includes a retractable spool 12, inside of which the actual cable 13 and a portion of the locking mechanism 15 may be housed. The retractable spool 12 would be encased within an impenetrable hardened steel or comparable casing.

Mounted to the underside of the bicycle lock 10 and positioned one directly atop the other would be two, curved rectangular shaped metal screw bands (e.g., support straps 55), configured expressly for mounting the unit to the bicycle 50 framework via threaded or flat head screws. Housed within bicycle lock 10 is the locking mechanism 15. The cable 13 may be comprised of a durable steel material and coated in rubber, with the end of the cable 13 emerging from a slotted opening located on one side of the housing 11.

Notably, the proximal end 21 of this cable 13 culminates in a security lock (e.g., fastener 14 that is designed to be inserted within a female receptacle located at the locking mechanism 15. This fastener 14 would be secured via a unique security implement. A key 40 is utilized to release the locking mechanism 15 from the spool 12. The retractable spool 12 at which this cable 13 is wound, may be spring loaded, thus gently tugging on the end of the cable 13 enables the user to retrieve it from its casing, while gently releasing the cable 13 would cause it to retract back in the housing 11 and back around the spool 12.

Application and use of bicycle lock 10 would be very simple and straight forward. First, the user would mount the lock 10 to their bicycle 50 framework in the desired location, such as on the seat bar, head tube or down tube, via the two, heavy duty supports straps 57, for example. Carrying bicycle lock 10 key 40 on the person, the user could then embark on their designated excursion.

Upon parking their bicycle 50, the user would insert the key 40 into the dedicated lock mechanism 15 to release the locking mechanism 15 from the retractable spool 12 and fastener 14 from the locking mechanism 15. Pulling the cable 13 from the housing 11, the user would then thread the cable 13 around the various components of the bicycle 50, such as through the front and rear tires, around the framework and about the actual bike rack or mounting post. The user would then insert fastener 14 located on the end of the cable 13 into the dedicated female fitting located at the locking mechanism 15, again locking the bicycle lock 10 with the included key 40. The secured bicycle 50 could then be left in place as the user went about their scheduled activities. Upon returning to their bicycle 50, the user would again use the key 40 to release the locking mechanism 15 from the retractable spool 12 and release the fastener 14 from the locking mechanism 15, thereby retracting the cable 13 back into the housing 11. The user could then remove their bicycle 50 from the rack or support post and be on their way.

Bicycle lock 10 is a practical product which offers consumers a number of significant benefits and advantages. Foremost, bicycle lock 10 provides a simple and efficient means of preventing the theft of bicycles and bicycle parts. A heavy duty locking system boasting a retractable cable lock that can be threaded through the tires and bicycle 50 framework in order to securely mount it to the bicycle rack, the impenetrable housing 11 would provide an effective means of locking one's bike.

Preventing thieves from removing individual components such as the bicycle tires or seat, use of this handy product effectively thwarts nefarious individuals in their tracks. Sparing the consumer the costly expense of replacing stolen bikes and bicycle accessories, bicycle lock 10 effectively saves consumers money. Simple to use, consumers will appreciate the ease at which bicycle lock 10 could be mounted in place and accessed.

Universal in design, bicycle lock 10 could be easily attached to virtually any bicycle, including road, off-road and mountain bikes. In this manner, bicycle lock 10 would be equally well-suited for use with a child's first bicycle, as well as a professional's bicycle.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A bicycle lock for enabling a user to lock various components of a bicycle, said bicycle lock comprising:
    a housing including a retractable spool positioned therein;
    a flexible cable releasably wound about said retractable spool and partially exposed exterior of said housing;
    a fastener attached to said flexible cable and located exterior of said housing; and
    a locking mechanism located at said housing and selectively engaged with said fastener and said retractable spool;
    wherein, when said fastener is inserted into said locking mechanism and said locking mechanism is disposed at a first position, said flexible cable has a fixed longitudinal length;
    wherein, when said fastener is removed from said locking mechanism and said locking mechanism is disposed at a second position, said flexible cable has an adjustable longitudinal length;
    wherein said flexible cable comprises
        a proximal end statically affixed to said fastener,
        a distal end statically affixed to said retractable spool, and
        a medial portion monolithically formed with said proximal end and said distal end;
    wherein said retractable spool comprises
        a central hub statically affixed to an interior of said housing and anchored to said distal end of said flexible cable, and
        a spring coupled to said central hub, said spring being selectively biased between a non-tensioned state and a tensioned state when said central hub is articulated in a first rotational direction and an opposite second rotational direction, respectively;
    wherein said spring automatically returns to said non-tensioned state when said locking mechanism is operably disengaged from said retractable spool;
    wherein said spring is maintained at said tensioned state when said locking mechanism is operably engaged to said retractable spool and said medial portion is partially extracted from said housing;
    wherein said retractable spool comprises a plurality of spokes fixedly coupled to said spring.

2. The bicycle lock of claim 1, wherein said locking mechanism comprises:
    a first receiving slot positioned along an outer peripheral edge of said housing, wherein said fastener is slidably inserted into said first receiving slot and is frictionally fit therein such that said first receiving slot is releasably engaged with said fastener.

3. The bicycle lock of claim 1, wherein said locking mechanism further comprises:
    a portable key;
    a second receiving slot operably engaged with said portable key; and
    a lever operably connected to said second receiving slot;
    wherein said lever is selectively engaged and disengaged with said plurality of spokes when said portable key rotates said second receiving slot to said first position and said second position, respectively.

4. The bicycle lock of claim 2, wherein said flexible cable has said fixed longitudinal length when said fastener is positioned within said first receiving slot and said locking mechanism is engaged with said retractable spool;
    wherein said flexible cable has said adjustable longitudinal length when said fastener is removed from said first receiving slot and said locking mechanism is disengaged from said retractable spool.

5. A bicycle lock for enabling a user to lock various components of a bicycle, said bicycle lock comprising:
   a housing including a retractable spool positioned therein;
   a flexible cable releasably wound about said retractable spool and partially exposed exterior of said housing;
   a fastener attached to said flexible cable and located exterior of said housing; and
   a locking mechanism located at said housing and selectively engaged with said fastener and said retractable spool;
   wherein, when said fastener is inserted into said locking mechanism and said locking mechanism is disposed at a first position, said flexible cable has a fixed longitudinal length;
   wherein, when said fastener is removed from said locking mechanism and said locking mechanism is disposed at a second position, said flexible cable has an adjustable longitudinal length;
   wherein said first position is a locked position, and said second position is an unlocked position;
   wherein said flexible cable comprises
      a proximal end statically affixed to said fastener,
      a distal end statically affixed to said retractable spool, and
      a medial portion monolithically formed with said proximal end and said distal end;
   wherein said retractable spool comprises
      a central hub statically affixed to an interior of said housing and anchored to said distal end of said flexible cable, and
      a spring coupled to said central hub, said spring being selectively biased between a non-tensioned state and a tensioned state when said central hub is articulated in a first rotational direction and an opposite second rotational direction, respectively;
   wherein said spring automatically returns to said non-tensioned state when said locking mechanism is operably disengaged from said retractable spool;
   wherein said spring is maintained at said tensioned state when said locking mechanism is operably engaged to said retractable spool and said medial portion is partially extracted from said housing;
   wherein said retractable spool comprises a plurality of spokes fixedly coupled to said spring.

6. The bicycle lock of claim 5, wherein said locking mechanism comprises:
   a first receiving slot positioned along an outer peripheral edge of said housing, wherein said fastener is slidably inserted into said first receiving slot and is frictionally fit therein such that said first receiving slot is releasably engaged with said fastener.

7. The bicycle lock of claim 5, wherein said locking mechanism further comprises:
   a portable key;
   a second receiving slot operably engaged with said portable key; and
   a lever operably connected to said second receiving slot;
   wherein said lever is selectively engaged and disengaged with said plurality of spokes when said portable key rotates said second receiving slot to said first position and said second position, respectively.

8. The bicycle lock of claim 6, wherein said flexible cable has said fixed longitudinal length when said fastener is positioned within said first receiving slot and said locking mechanism is engaged with said retractable spool;
   wherein said flexible cable has said adjustable longitudinal length when said fastener is removed from said first receiving slot and said locking mechanism is disengaged from said retractable spool.

* * * * *